United States Patent [15] 3,660,824
Möder et al. [45] May 2, 1972

[54] METHOD AND CIRCUIT ARRANGEMENT FOR THE SUPERVISION OF CONNECTIONS IN STORAGE-PROGRAMMED TELECOMMUNICATION SWITCHING INSTALLATIONS FOR BINARY, CODED MESSAGES

[72] Inventors: Hans-Ulrich Möder; Bernhard Schaffer, both of Munich, Germany

[73] Assignee: Siemens Aktiengesellschaft, Berlin and Munich, Germany

[22] Filed: Feb. 5, 1970

[21] Appl. No.: 8,967

[30] Foreign Application Priority Data

Feb. 5, 1969 Germany......................P 19 05 659.8

[52] U.S. Cl...........................................................340/172.5
[51] Int. Cl...........................................................G06f 9/02
[58] Field of Search................................340/172.5; 235/157

[56] References Cited

UNITED STATES PATENTS

| | | | |
|---|---|---|---|
| 3,344,410 | 9/1967 | Collins et al. | 340/172.5 |
| 3,403,382 | 9/1968 | Frielinghaus et al | 340/172.5 |
| 3,337,853 | 8/1967 | Harrand | 340/172.5 |
| 3,331,055 | 7/1967 | Betz et al. | 340/172.5 |
| 3,364,472 | 1/1968 | Sloper | 340/172.5 |

*Primary Examiner*—Paul J. Henon
*Assistant Examiner*—Mark Edward Nusbaum
*Attorney*—Birch, Swindler, McKie & Beckett

[57] ABSTRACT

A method and apparatus for the supervision of connections in storage-programmed telecommunication switching installations for binary coded messages is described. The information identifying transmitters to be supervised is recorded at permanently assigned storage locations such that the assigned location will be checked first. Only when the stored information demands supervision, the bit combination which is contained in the word stored therein, is checked in a program control and changed. The changed bits are recorded in each case during a single storage cycle through operations similar to the logic OR operation, taking place at the store itself, the changed bits being recorded into the assigned storage location. Therefore, only those transmitter cells are tested which are to be supervised, and erroneous over-writing is avoided.

19 Claims, 8 Drawing Figures

METHOD AND CIRCUIT ARRANGEMENT FOR THE SUPERVISION OF CONNECTIONS IN STORAGE-PROGRAMMED TELECOMMUNICATION SWITCHING INSTALLATIONS FOR BINARY, CODED MESSAGES

BACKGROUND OF THE INVENTION

The invention concerns a method and a circuit arrangement for the supervision of connections in storage-programmed telecommunication switching installations for binary, coded messages. In such devices the lines are connected to a line connection unit for receiving and transmitting the polarity changes within the binary messages, and the connections between the transmitters and receivers are established, or broken, with the aid of a program control. The transmitters and receivers communicate with a storage unit containing the data and programs necessary to perform the switching operations, wherein a storage area for the reception of a storage word is permanently assigned to each transmitter which contains during a connection an internal connection number which identifies the receiver in each case and an information about the direction of the last polarity change, as well as about the state of a counter which is set back to zero by each incoming polarity change. The counter state is read and checked by the program control at certain time intervals, whereby the counter registration in the case of one of the two possible directions of the last polarity change is increased by "1", and upon the reaching of predetermined counter registration, the release of the connection is initiated.

In telecommunication switching installations for binary messages which in the following are designated in short as data switching installations, one must be able to check subscriber- and trunk lines for permanent potentials, for example, for permanent start polarity as release criterion. Thus, for example, connection lines to single-current subscribers are to be checked for 300 ms. start polarity, and lines to long distance subscribers, as well as trunks, for 600 ms. start polarity.

Such time dependent criteria are detected and evaluated in electromechanical switching installations through relays or relay circuits, the increase and drop out times whereof, are influenced according to their task.

There is in the prior art a full electronic teleprinter switching installation which operates according to the time division multiplex principle, wherein one of several central connection elements is assigned to a calling subscriber, said one connection element, contains an electronic device for the detection of the clearing signal.

DESCRIPTION OF A PRIOR ART SYSTEM

In centrally controlled, storage programmed switching installations it is attempted to solve as many switching tasks as possible for the purpose of reducing costs with the aid of the central control and of a stored program. Among these tasks there is also the supervision of connections. In German Pat. application No. P 15 12 490.0 there is already described a method for the detection of permanent potentials which can be applied in centrally controlled, storage-programmed switching installations, which operate according to the so-called code-multiple principle. This method makes possible storage-programmed connection supervision without the expenditures resulting from the centralization.

The switching installation in which this method is applied is shown in FIG. 1 of the drawings. The installation is developed of external and internal units. Of the external units FIG. 1 shows only the line connection unit LE for the connection of the subscriber- and trunk lines to the installation. Line connection units of this type are known, and an exemplary description of same may be found in a commonly assigned U.S. Pat. application, Ser. No. 71,675, filed Sept. 14, 1970. It receives the polarity changes arriving from the lines and identifies the transmitter in question by determining the internal connection numbers, or addresses, selects with the aid of the adresses of the receivers, the receiver line in each case, and transmits polarity changes over lines L. Over conduit A1, which in FIG. 1 is shown as simple connection line, but consists of a plurality of parallel conductors, the line connection unit is connected with storage unit SE. This storage unit is constituted by the actual operating store KS, for example, a core storage means, which contains the data and programs necessary to perform the switching tasks, a storage operating control SOPS for programming the different storage operations, a storage request control SAFS for the assignment of the storage cycles to the requesting controls and a program request control PAFS which allows the control units LE and PSt to request programs. An example of a suitable storage control SAFS may be found in commonly assigned U.S. Pat. application, Ser. No. 57,926, filed July 24, 1970.

In the position-addressed operating storage, a storage area is permanently assigned to each transmitter. This storage area, herein identified as a "transmitter cell", receives among other things the assignment between the transmitter and the receiver, as well as the direction of the last polarity change in each case. As is well known, operation control SOPS contains, among other things, the input and output registers of the store and the storage program control with the synchronization supply and the area protection supervision. The storage request SAFS receives from the available controls which operate independently from one another, their requests for assignment of storage cycles, and these are assigned to them dependent on their class of priority. Thus, the storage request control fulfills the tasks of the priority control for the operating storage, customary in known data processing installations (see, for example, Electronic Calculating Systems, 1961, second issue, pp. 54–60). Finally, each control can request, by a program, other programs in itself or in another control. Such requests are directed to the central program request control PAFS and there noted by the data identifying them, are checked by all processing units PSt, continuously or at suitable points in time, and are finally taken over by the processing unit provided for the task in question.

Of the processing units for processing programs, FIG. 1 only shows program control PSt, which is connected to storage unit SE over conduit A2.

During the establishment of a connection, the address of the receiver is determined from the dial signals of the called subscriber. This address is recorded into the said transmitter cell. At each polarity change arriving on the line, the line connection unit LE requests a storage cycle, over conduit A1, at the storage request control SAFS. The address assigned to the transmitter line in each case is transmitted, over conduit A1, on call, and in parallel into the address register of the storage operation control SOPS. At the same time, the information as to the direction of the polarity change is recorded into a word register. The line connection unit additionally communicates by means of an additional signal transmitted in parallel to the address signal, to the storage operation control that the contents of the addressed storage cell are to be read. The read storage work reaches the word register without cancelling the there stored information about the direction of the new polarity change, because it is, for example, retained statically. The receiver address and the direction of the polarity change are then conveyed to the line connection unit which transmits the polarity change to the line in question. During the writing process within this reading cycle, which follows the reading process, the storage word with the information about the direction of the new polarity change is written back into the transmitter cell.

For the purpose of checking for permanent polarity there has now already been suggested in the said German Pat. application No. P 15 12 490.0 to provide in the transmitter cells additional bits in each case for the storing of a counter registration. The program control cyclically interrogates all transmitter cells at a certain time interval, which depends on the duration of the potential to be supervised and which in this example is 120 ms. for the supervision of clearing signals of a 300 ms. length. During an interrogation, the contents of the transmitter cell in question are transmitted into the aforementioned word register and checked by the program control. If the counter registration has not yet reached a certain limit, and if the test of the bit indicating the direction of the last polarity change reveals that the polarity to be supervised is present, the counter registration is increased by "1". Subsequently, the storage word is again recorded into the transmitter cell in question with changed counter registration. However, an incoming polarity change again places the counting bits on zero, so that the counter registration can reach the said predetermined limit only if the potential on the line remains unchanged during a certain minimum time period. If the program control recognized during an interrogation that the highest counter registration has been reached, the release of the connection in question is initiated.

As has already been described in the above mentioned German Pat. application No. P 15 37 354.3, the storage cycles requested by the line connection unit LE are assigned to it, and this assignement is of highest priority. For the interrogation of the transmitter cells and for the changing of the counter registration the program control, or the therein proceeding supervision program, also needs several operating storage cycles which it receives with lower priority. It is possible, therefore, that the line connection unit will receive an operating storage cycle and record a new polarity change into the transmitter cell before the program control can re-record the storage word read out of this transmitter cell in an interrogation and with a changed counter registration being read into the transmitter cell. Therefore, the place in the transmitter cell where the new polarity change is contained could erroneously be over-written by the program control. Moreover, the testing of transmitter cells which per se are not to be supervised requires storage cycles, thereby increasing the load of the store and of the program control.

OBJECTS AND SUMMARY OF THE INVENTION

It is, therefore, an object of the invention to provide a method and apparatus for the cyclic interrogation of the transmitter cells in storage-programmed telecommunication switching systems which avoids the over-writing by the program control of polarity changes which are stored in the transmitter cells, and which results in a lesser additional load on the program control and on the store.

According to the invention this task is accomplished in that an information identifying the transmitters to be supervised is recorded at a storage location in each case permanently assigned to each transmitter, that in each case this storage location is checked first, and only when the there stored information demands supervision, the bit combination which is contained in the said storage word is checked in the program control and changed. The changed bits are recorded in each case during a single storage cycle through an operation in the nature of the logic OR operation at the store itself, into the storage location assigned to the transmitter in question.

In this manner it is achieved that only those transmitter cells are tested which are also to be supervised. With the aid of this method operating storage cycles can therefore be saved. In addition due to the OR-connection of the tested storage word with the newly read storage word in the word register of the operating storage an erroneous overwriting of the transmitter cell is avoided.

This result could also be achieved through the fact that two cells are assigned to each transmitter. Then the program control should read only the cell in which the direction of the last polarity change is noted. The counter bits would have to be received in the second cell in each case. However, as compared to the invention herein, this solution would have the disadvantage that two cells would have to be provided per transmitter, and that for the testing of the direction of the last polarity change, as well as of the meter stand, two cells will have to be read, and accordingly, two storage cycles are also required.

BRIEF DESCRIPTION OF THE DRAWINGS

The invention may be best understood by reference to the description hereinbelow in conjunction with the drawings in which.

DESCRIPTION OF A PREFERRED FORM OF THE INVENTION

Figure 1:
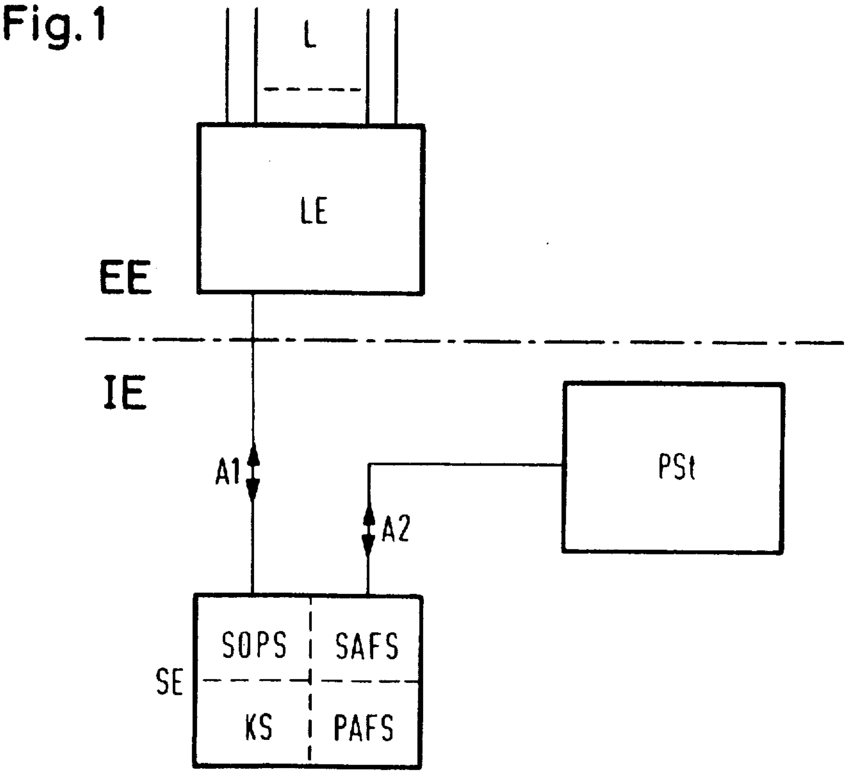
FIG. 1 is a schematic drawing of a prior art device.

In a preferred embodiment of the invention all transmitter cells are divided into several equal groups. The groups are interrogated within a time interval which is equal to the quotient of the interrogation interval and the number of groups for step-by-step interrogation. However, the transmitter cells within a group are interrogated in direct succession. This method possesses advantages as compared to the successive interrogation of all transmitter cells, wherein a successive loading of the operating store and of the program control results. The interrogation of the transmitter cells with low priority would have to be carried out at the store if undue delay in assignement of storage cycles to controls having programs requiring processing is to be avoided. The fluctuations of the interrogation interval of the transmitters to be interrogated last in each interrogation cycle would thereby become uncontrollable as well. On the other hand the preferred method, as compared to a step-by-step interrogation of all transmitter cells with even loading of the central units, has the advantage that the share of the organizational program in the loading of the central units is smaller. This organizational program, known in data processing for the control of the simultaneous processing of several programs, runs off with each step in the step-by-step interrogation, but in the preferred process only upon the start of interrogation of a group.

In order to prevent the testing of transmitters which are not to be supervised, the information for the identification of such transmitters can be stored jointly with the address of the receiver, the direction of the last polarity change and the counter registration in the transmitter cell in question.

Fewer storage cycles are required by an especially advantageous alternative embodiment of the invention wherein in each case only the transmitter cells to be supervised are interrogated. This solution is characterized by the fact that the information identifying the transmitters to be supervised is stored in a so-called indication field within the store, wherein a bit is permanently assigned to each transmitter cell to be supervised. This indication field is formed by a block of directly successive storage cells. In each case one storage cell of this indication field is taken over by the program control and tested. Only those transmitter cells are interrogated whose bit is set on "1+ in the said storage cell.

In a further embodiment of the invention a transmitter cell to be interrogated is read prior to the testing of the counter registration in a complete storage cycle. Only then, the changed counter registration is conveyed to the transmitter cell with the storage operation "OR". Thus, principally each increase of the counter registration requires two storage cycles. This is avoided in a further embodiment of the invention through the fact that first principally the counter registration of the transmitter cell to be interrogated is set with the storage operation "OR" on a certain minimum registration, and only then is it checked whether the counter registration is to be again increased with a further storage operation "OR", whether the connection is to be released, or whether the next transmitter cell is to be interrogated. As connections are only seldom released, and also the increase of the counter registration by a further storage operation "OR" is only rarely required, this method requires considerably fewer storage cycles.

In a simple form of the invention the forming and making available of the addresses of the transmitter cells is carried out with the aid of an address register within the program control, which is connected over an address register of the program control with the address register of the storage operation control. At the beginning of each interrogation cycle, the starting address of the storage area receiving the transmitter cell is stored in this register. The operation control for the interrogation command increases in each case at every step of the interrogation cycle the address meter register by the distance of the addresses of the transmitter cells to be interrogated, and releases the reading of the transmitter cell addressed in each case out of the store. As this development form requires only a relatively low switching expenditure, it is also suited for the de-central arrangement of the connection supervision in the line connection unit. A desire for release is communicated to the program control which then initiates the release.

As compared to this solution, a further embodiment has the advantage that the size of the groups is variable, i.e. can be determined by the programmer and is therefore adaptable without circuit changes to different office sizes. In this arrangement the starting address of a group of transmitter cells is in each case transmitted into a first register of the program control and the number of transmitter cells in the group is entered into a second register of the program control. The contents of the first register are then increased at every step of the interrogation command and the contents of the second register decreased by "1".

In the advantageous circuit arrangement to carry out the said interrogation process with indication field, the address of the first storage cell of the indication field is transmitted at the beginning of the interrogation of a group of transmitter cells into a first register of the program control. The operation control increases the contents of this register in each case after working-off of the addressed indication cell and controls the transmission of the storage word contained in this indication cell into a shift register within the program control. The contents of the shift register are shifted until a testing device recognizes the binary condition, identifying a request for supervision, of the indication bit appearing at the outlet of the shift register, and prevents the counting-on of the meter, or the moving-on of the shift register. The address of the transmitter cell assigned to the indication bit is formed with the aid of the first register and the meter.

In this development form the costs for connection supervision can be reduced through the use of switching elements existing in the program control in any event. Thus a multi-purpose register of the program control is used as first register; the customary accumulator is used as shift register and the also known displacement meter of the accumulator is used as meter.

Figure 2:
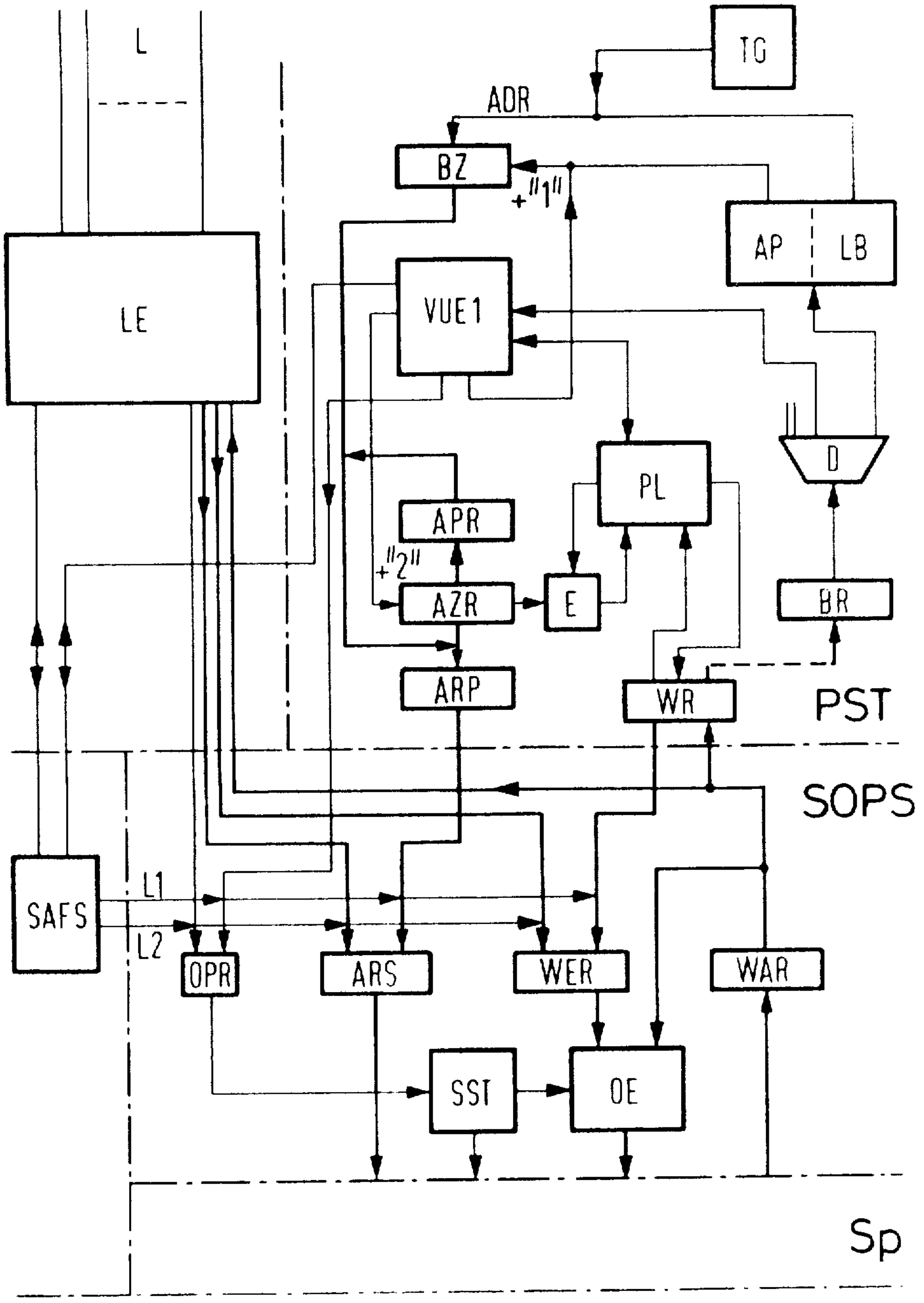
FIG. 2 is a schematic representation of an exemplary form of the switching installation according to this invention illustrating only the most important registers necessary to carry out the method with address registers.
Figure 4:
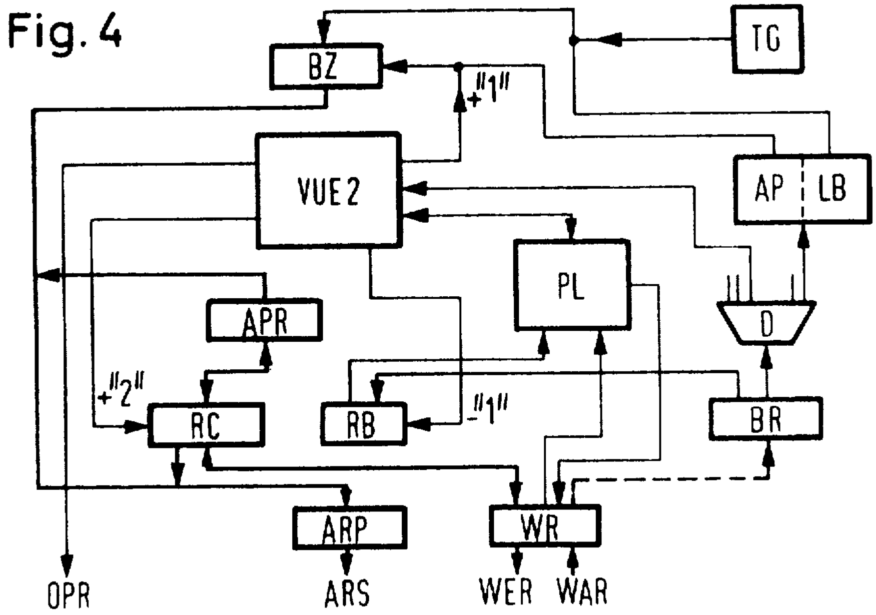
FIG. 4 schematically illustrates a form of the most important registers of the program control to carry out the method with variable size of the groups.
Figure 5:
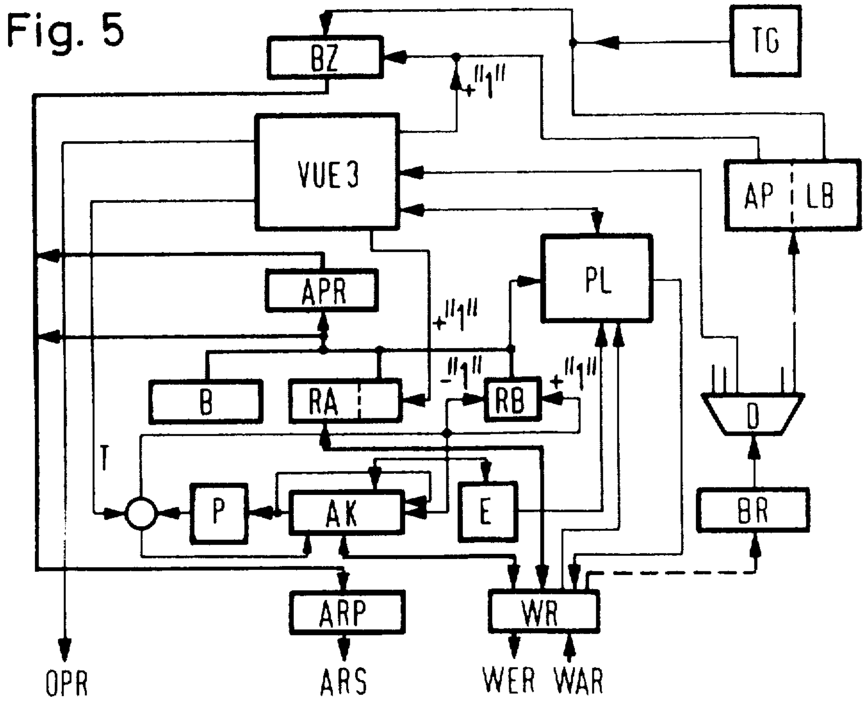
FIG. 5 schematically illustrates a form of the most important registers of the program control to carry out the method with indication field.

In FIGS. 2, 4 and 5 all lines are parallel transmission of storage words are drawn in with thick lines, all control lines, however, with thin lines. The figures contain only the control lines which are absolutely necessary to understand the invention. All control lines which are provided in known manner for opening and closing of the transmission paths between the registers, or between the registers and the store, have been omitted for reasons of clarity.

FIG. 2 shows in the upper left the line connection unit LE with lines L, in the lower left the storage request control SAFS which is connected over control lines with line connection unit LE, program control PSt, as well as storage operation control SOPS, in the lower right storage operation control SOPS and store Sp as well as in the upper right program control PSt. Storage operation control SOPS corresponds essentially to the development already suggested in German Pat. application No. P 18 08 678.3. Controls LE and PSt communicate with store Sp over word input register WER and word output register WAR. Operation system OE connects the contents of word output register WAR and word input register WER and, among other things, carries out the storage operations "OR", as well as "reading-changing", with the aid of which according to the suggestion of the German Pat. application No. P 15 37 344.1 the direction of new polarity changes is recorded in each case within a storage cycle into the transmitter cells. The type of operation is determined by the storage program control SSt, which decodes the contents of a register OPR, settable by controls LE and PSt, for the storage operation code. The decoding circuit used is conventional in every respect, and for this reason is not described further herein. Storage program control SSt fulfills, in a manner known per se, the tasks of synchronization supply and area protection testing of the store, of parity-bit-testing and I-wire-selection. Address register ARS, or word input register WER can be reached in each case from line connection unit LE as well as from address register ARP, or word register WR of program control PSt. Which of the controls attains access to these registers is deterimined by the storage request control SAFS which assigns in each case the next following storage cycle to the control with higher priority and opens the transmission paths over control line L1 or L2.

Of the program control there are shown in addition to address register ARP, word register WR, command register BR, command decoder D command counting means BZ, and testing logic element PL to test and change the meter registration within the transmitter cells, as well as an operation control VUE1 for a wired program for the interrogation of the transmitter cells. The address of the transmitter cell to be interrogated in each case is in a register, the contents whereof can be changed according to different methods (FIGS. 2, 4, 5: AZR; RC; B, RA RB). The address of a connection to be released is conveyed from this register for the processing of the release program into another register ARP of the program control PSt.

In the following working example it is assumed that each connection between single current subscribers — as customary in teleprinter networks — is supervised for a permanent start polarity of 300 ms. The transmitter cells are then — as already described in German Pat. application No. P 15 12 490.0 — suitably interrogated every 120 ms. If a total of 512 transmitters are to be interrogated, there are formed 32 groups of 16 transmitters each in case of group interrogation. Based on the interrogation cycle of 120 ms., the groups are then to be interrogated at a synchronization interval of 3.75 ms. The transmitter cells of a group are interrogated in direct succession, unless a control with higher priority requests storage cycles at the store.

The transmitter cells are arranged in the store in the form of a block which starts at a fixed storage address. To each transmitter two successive storage cells are assigned, of which, however, only the first contains data which are necessary for the transmission of polarity changes and for connection supervision. The address of the just processed transmitter cell must thus be increased in each case by a "2", in order to obtain the address of the next transmitter cell. For purposes of connection supervision the first transmitter cell in each case — in the following called transmitter cell for short — contains four bits: bit N identifies the condition "supervision" (value "0") or "no supervision" (value "1"); bit P identifies the direction of the last polarity change, or the polarity on the line. If start polarity is on the line, this bit is placed on "1", in case of stop polarity on "0". Two bits are provided for the storing of the counter registration. Counter bit combination "00" corresponds to counter registration "0", combination "10" to counter registration "1", and combination "11" to counter registration "2". This counter registration is reached after at least three interrogations of a transmitter cell.

The interrogation of a group of transmitter cells is started by a synchronization pulse with a pulse duration of 3.75 ms. with the aid of the program request control. This program request takes place according to the method already described in German Pat. application No. P 15 37 354.3.

In FIGS. 2, 4 and 5 this program start is symbolized by pulse generator TG which in each case causes the recording of the starting address ADR of the supervision program into the command counter after 3.75 ms. This pulse generator is of conventional construction and need only be designed to produce the pulse described in the paragraph immediately above. The supervision program consists essentially of a permanently wired program which reduces the load on the program control and of the store. The special command for this program is in each case first read and transmitted into the command register BR of the program control (FIGS. 2, 4, 5).

The broken, thick connection line between word register WR and command register BR of program control PSt is to indicate that this (line) is needed only for purposes of connection supervision at the beginning of the interrogation of a group or after the processing of a release program. Over the command decoder the operation control VUE is selected for the special command which operation control (VUE) can be developed in a manner known per se of a shift register (Feeding Means, Digital Calculating Systems, Springer Publications, 1965, p. 241). This operation control VUE now controls, dependent on the system pulse, the carrying out of the interrogation command. The command is terminated after a group of transmitter cells has been worked off, which fact is determined by a counter (ZZZ,RB) supervised by testing logic PL. The contents of the command counter are now increased by testing logic PL and transmitted to register ARP. The so addressed new command reaches, over the word register of the program control, the command register. After the starting condition for the interrogation of the next group of transmitter cells has been established, the supervision program is also terminated.

After the test logic PL has detected a connection to be released through testing of bits N, P, X, Y at the word register of the program control, the contents of command counter BZ are increased by the test logic, and the address of the transmitter cell in question is transmitted into a register APR of the program control to which the now following program for release of the connection has access. The data required for the interrogation of subsequent transmitter cells in this group are, in a given case, safeguarded in registers which are not accessible to the release program. With the next command, the address of which is set by the operation control VUE through an increase of the command counter, the program for the release of the connection AP is initiated: this program is an ancillary matter and need not be explained in more detail here. The program request proceeds in the same manner as at the start of the supervision program through pulse generator TG. The last command LB of the release program then again places the command counter on the starting address of the supervision program, or—if the data necessary for the interrogation of the remaining transmitter cells within the group, the address of the transmitter cell to be interrogated next, and the number of the transmitter cells still to be interrogated were safeguarded during the processing of the release program — on a command to load the register for the transmitter cell to be interrogated in each case.

The storage cycles for the reading of the transmitter cells are requested in each case by operation control VUE at the storage request control SAFS. The operation control also controls the setting of the register OPR for the storage operation code. If the testing of the contents of a transmitter cell, stored in word register WR, by test logic PL, and prepared by the operation control, has revealed that the counter registration of $X,Y$="00" must be changed into $X$, $Y$="10", or from $X$, $Y$="10" into $X$, $Y$="11" ($P$="1", $N$="0"), bit $X$, or bit $Y$ in the word register is placed on "1". All bits not to be changed are cancelled. Now, the operation control requests a storage cycle and loads register OPR with a combination corresponding to the storage operation "OR". The contents of the word register are transmitted into word input register WER and the address of the transmitter cell in question into address register ARS. The storage word is conveyed to word output register WAR, connected with the aid of operation system OE with the contents of word input register WER and recorded back with changed meter stand into the store. It can happen thereby that the line connection unit LE sets the counter bits and the $P$-bit of the transmitter cell in question back to zero before the new counter registration is given into the transmitter cell with storage operation "OR". In this case there results in the transmitter cell the meter bit combination "10" or "01" through the storage operation "OR". As however, the polarity not to be supervised, in this example stop polarity, is then present on the line assigned to this transmitter cell, and therefore the counter registration is not changed, the next polarity change initiating the supervision of the start polarity will set the counter bits again to "0", so that no error occurs.

With each arriving polarity change the counter bits in the transmitter cell in question are put on "0". For this purpose the line connection unit LE places the corresponding bits in word input register WER on zero. Through the storage operation "read-change" this counter registration is also recorded from the word input register into the transmitter cell, in addition to the new polarity change.

The different forms of the invention essentially differ by the manner of forming the address for the transmitter cell to be interrogated in each case. In the program control according to FIG. 2, an address meter register AZR is provided, the contents whereof are increased by "2" by the operation control VUE1 in each case after the execution of the last operation at the interrogation of the last interrogated transmitter cell if—as was assumed above—to each line two successive storage cells are assigned and the direction of the last polarity change, as well as the meter bits are stored in each case in the first of these two transmitter cells.

Figure 3:
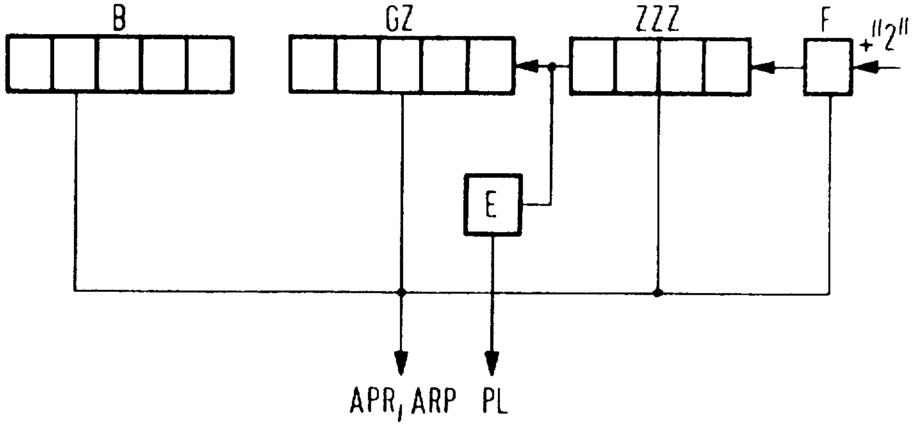
FIG. 3 is a schematic representation of the address register used in the FIG. 2 embodiment.

FIG. 3 shows the construction of the address meter register. The address meter register consists of a basis register B, which can be developed so as to be plugged in, and which determines the beginning address of the block of the transmitter cell to be interrogated, a group counter GZ to count the interrogated groups, a cell counter ZZZ to count the transmitter cells already interrogated within a group, a one-bit store E to determine the overrunning of the cell counter and a further one-bit store F, which is, however, placed on zero in each case after the increase of the contents of the address counter register which are interpreted as a decimal number, are always an even number. Proceeding from the above-said division of 512 transmitter cells into 32 groups of 16 transmitter cells each, the cell counter must have four digits and the group meter five. The address of a transmitter cell is formed out of the contents of the basis register, the group counter and the cell counter, as well as the one-bit store F, in that the bits of these registers are conveyed parallel to the store or to the program control. In each case after working off of a group of 16 transmitter cells the cell counter reaches its highest stand, the overrun store E is set and the group counter switched forward by "1". Test logic PL tests the overrun bit and in a given case communicates to the operation control VUE1 that the interrogation command is terminated. Subsequently, the overrun bit E is again set back by the test logic PL.

The interrogation can also be adapted to different transmitter numbers if either the size of the group, i.e. counter ZZZ, or the end of counting, i.e. store E are developed so to be plugged in.

Another form of the invention, which also offers the possibility to adapt the number and the size of the groups of transmitter cells to different transmitter numbers, is shown in FIG. 4. There the shown program control contains a register RC for the reception of the address of the transmitter cells to be interrogated in a counter RB, which can be identical with the shifting counter of the accumulator and which indicates the number of the transmitter cells within a group which have not been interrogated. At the beginning of the interrogation of a group register, RC is loaded with the beginning address of the group. Subsequently, the interrogation command is read and the operation control VUE2 selected. The number of transmitter cells to be interrogated is contained in the address part of the command and is transmitted to meter RB by command register BR. This transmission is already controlled by operation control VUE2. The beginning address is noted in an auxiliary cell of the store. The contents of register RC are increased by "2" at each step of the interrogation command by operation control VUE2, so that the address of the transmitter cell to be interrogated next is stored in register RC. The contents of register RB, however, are lowered by "1" at each step of the command. After the group has been processed, the register RB is, therefore, on zero. This is recognized by test logic PL and communicated to operation control VUE2, which thereupon records the address of the last transmitter cell which was increased by "2" back into the auxiliary cells as beginning address of the next group, and switches the command meter BZ forward.

After the test logic has recognized a line to be released and has communicated this to the operation control, the address of the transmitter cell in question is transmitted from register RC into the multi-purpose register APR within the program control, which is accessible to the subsequent release program. The release program is requested and processed in the already described manner.

After the termination of this program the condition of register RC, which existed prior to the request of the release program, is again established in that the address of the transmitter cell in question is transmitted from the multi-purpose register APR into register RC. Subsequently, the interrogation command is read again and the operation control selected.

In the above described forms of the invention transmitter cells of such lines which are not to be supervised are read. These are lines not participating in any connection and trunk lines connected through in reverse direction. This includes the plurality of all lines. For this reason it is advantageous to identify lines to be interrogated and to read only such transmitter cells which are assigned to lines to be supervised. All transmitters which are to be supervised are for this reason noted during the connection establishment in a so-called indication field in the store.

Figure 7:
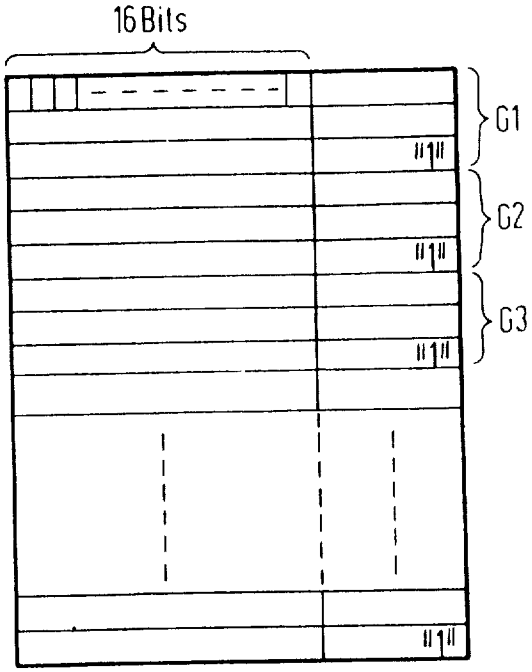
FIG. 7 schematically illustrates an arrangement of the indication cells in the store.

This indication field, shown in FIG. 7, is developed of a block of successive storage cells which store, for example, 24 bits, of which in each case the first 16 bits are used for purposes of indication. In each case one of these bits is assigned to each transmitter cell. During connection establishment this bit is set on "1" through an indication command. The end of a group G of transmitter cells is identified by a "1" at one of the locations, not used for transmitter cells, of the indication cell. If these groups consist, as assumed above, in each case of 16 transmitter cells, then for example bit 18 of each indication cell is set on "1".

A schematic embodiment of a means for realizing of an interrogation with indication field is shown in FIG. 5. There the shown program control differs from the arrangements shown in FIGS. 2 and 4 only by the registers for making addresses available and the operation control VUE3 which deviates in the details which are due to the program of the interrogation command from the development of controls VUE1 and VUE2. If a group of transmitter cells is to be interrogated, first, the indication cell in question must be available in the program control. With the 15-digit address of these transmitter cells in this example the 15-digit multi-purpose register RA is loaded in each case. The contents of this storage cell is transmitted into the accumulator AK, the bit identifying the end of the group from the accumulator into the one-bit store E. The contents of the accumulator is—controlled by operation control VUE3—shifted to the left by one unit with each synchronization pulse, until testing device P recognizes a "1" at the outlet of the accumulator and blocks the conveying of the pulses to the accumulator and to meter RB. At each synchronization pulse T, the shift counter RB of the accumulator is increased with a counting capacity corresponding to the number of indication bits in an indication cell by "1". The shift meter RB as well as the one-bit store E are supervised by test logic PL. A group of transmitter cells is processed when the shift counter has run off and the one-bit store is on "1".

Figure 6:
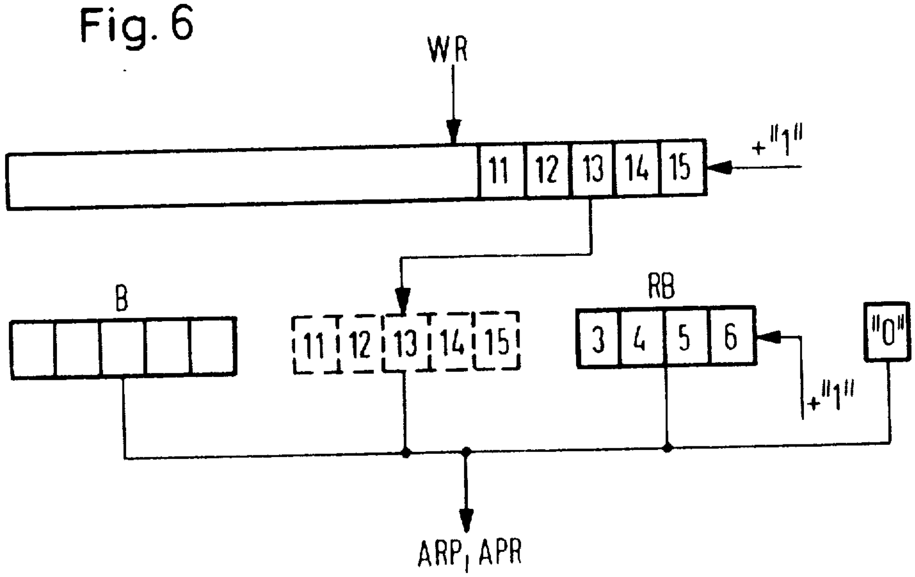
FIG. 6 is an exemplary illustration of the forming of the address in the method which utilizes an indication field.

FIG. 6 shows the forming of the addresses. In a store for $32,768 = 2^{15}$ words the addresses possess a length of 15 bits. The addresses of the transmitter cells to be interrogated are developed of three parts, each of which, in this example, consisting of five bits. The first part is fixed basis combination, which can be plugged in and can therefore be developed variably, which depends on the beginning address of the block of transmitter cells. This part possesses the highest rank.

The task of the group counter in the development form according to FIG. 2 is here taken over by the last five bits (11 to 15) of the address of the indication cell stored in register RA. This is true for a division of the transmitter cells into 32 groups. If 64 groups are formed, and naturally the last six bits of register RA must be used for the forming of the address. As these last bits are used to count the groups, the last five bits in the beginning address of the indication field must have the binary value of "0". Thus, the beginning address is a whole number multiple of 32. For the purpose of counting the transmitter cells within a group, in case of a group size of 16 ($2^n$) transmitter cells, the last four ($n$) bits of the meter RB are used. This meter RB is increased with each step of accumulator AK by "1". After the meter has run-off, this is recognized by test logic PL and communicated to operation control VUE3, which thereupon increases the contents of register RA by "1". To the digits of meter RB a further bit is added, which always possess the value "0". It is achieved in this manner that only every second transmitter cell is read. The address is composed as follows:

B/RA (11–15) / RB (3–6) / .

Figure 8:
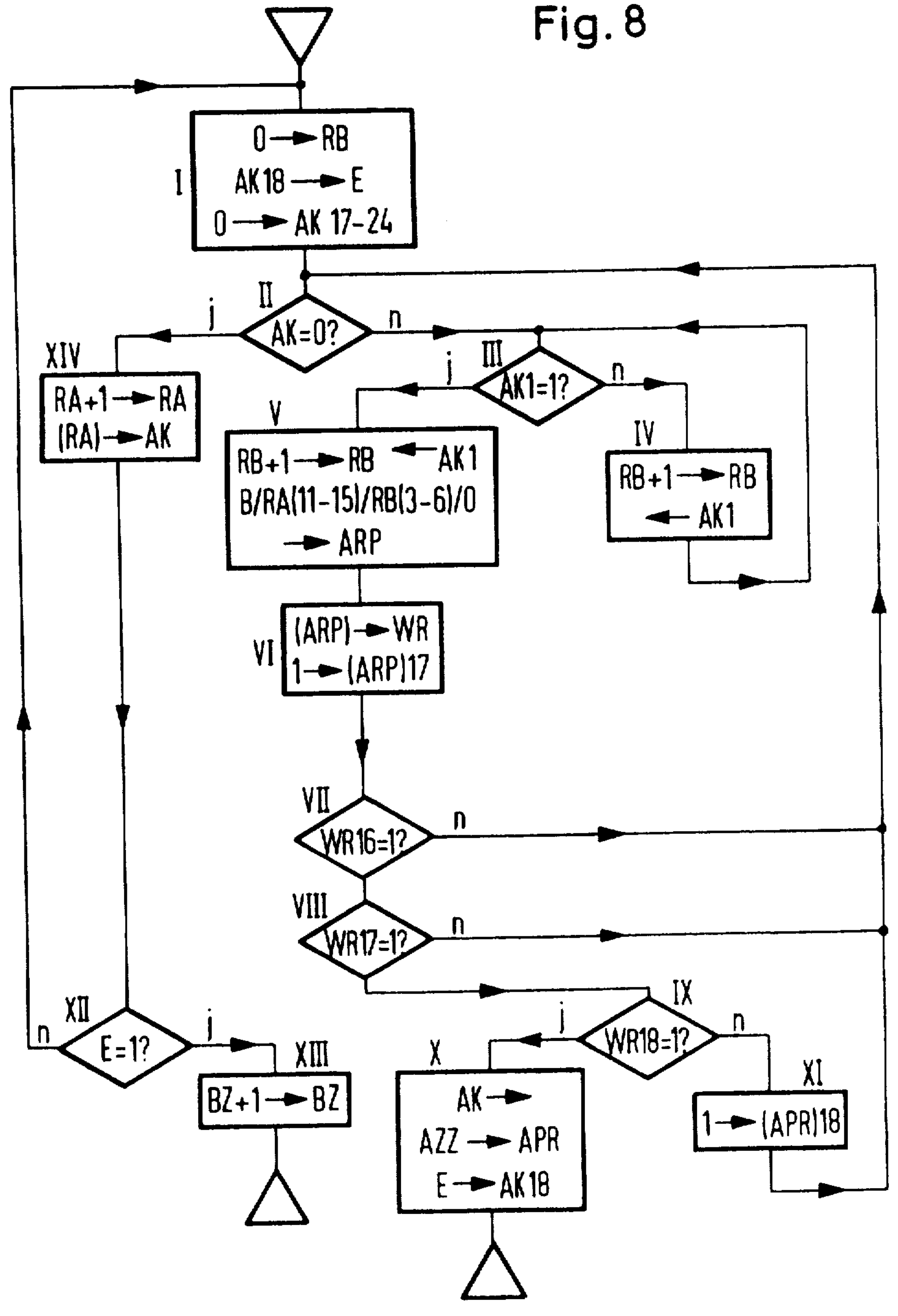
FIG. 8 is a flow diagram of the special command for connection supervision with indication field arrangement.

The program of the connection supervision with indication field will now be described with the aid of the flow diagram shown in FIG. 8. In this diagram the customary mode of designation is used. A register designation with a subsequent character $x$ designates the $x$-th bit of the register. However, if the symbol AK for the accumulator is identified by an arrow, thereupon following number signifies that the contents of the accumulator are to be shifted by the number of steps indicated by this number, in the direction of the arrow. The designation of a register in parenthesis (for example [RA]), identifies the contents of the storage cell which is addressed by the contents of the register. If a number follows such a symbol (RA), it designates the corresponding bit of the storage cell. For a positive decision in each case the letter "$j$", for a negative decision the letter "$n$" has been used in the diagram.

The program is started by an impulse generator, which causes the loading of the command counter BZ with the address of the first command of the supervision program. First, the register RA is loaded with the address of the indication cell to be processed and subsequently the contents of this indication cell transmitted into accumulator AK. FIG. 8 shows the program controlled by operation control VUE3.

The shift meter RB is first put on "0" and bit 18 of the accumulator, identifying the group end is transmitted into the one-bit-store E. Bits 17 to 24 of the accumulator are thereupon cancelled (I). Through a parallel test of the bits of the accumulator, the operation control VUE3 recognizes, with the aid of test logic PL, whether all bits of the accumulator AK are placed on "0". If this is the case (II, $j$), no transmitter cells are left to be processed in this group of transmitter cells. Therefore, the next indication cell is interrogated; the contents of register RA are increased by "1", and the contents of the new indication cell are transmitted into the accumulator (XIV) If the one-bit store E is placed on "1" (XII,j), the test logic reports that the group was terminated with the previously processed transmitter cell, and the operation control VUE3 increases the command meter BZ by "1". The interrogation command is now terminated. The address, stored in register RA, of the indication cell to be processed next is transmitted into an auxiliary cell of the store and is again available for the processing of the next group. Before the supervision program for the just processed group is finally terminated, the program control PSt, however, must also decide whether address A1 of this indication cell is longer or shorter than the address A2, increased by "1", of the last cell of the indication field. If the relation A1 ≤ A2 is true, the program control also processes the cell with address A1 in the customary manner. However, if address A1 is longer than address A2, the beginning address of the indication field is recorded into the said auxiliary cell, and at the next synchronization pulse the supervision is started with this indication cell.

If the one-bit store is not on "1", but on "0" (XII, n), the program begins again with the placing on zero of shift meter RB (I).

If the testing of the contents of the accumulator (II) has shown that the accumulator also contained different bits of "0" (II,n), the test logic PL determines whether the bit present at the outlet of the accumulator has the value "1" (III). If this is not the case (III,n), the test logic opens the way for synchronizing pulses T; the shift meter RB is increased by "1"; and accumulator AK is shifted to the left by one unit (III). The test "AK1 = 1 ?" is then repeated. If the condition AK1 = 1 is fulfilled (III,j), the reading of the counter RB is increased by "1" and accumulator AK is shifted to the left by one unit (V). The address formed according to the above given direction is then transmitted to address register ARP of the program control (V). The operation control VUE3 now requests a storage cycle. The processes shown in block VI of FIG. 8 proceed within a single storage cycle. Test logic PL usually first places the first of the two meter bits (bit 17 and 18 of the storage word) on "1" and cancels the other bits of the word register WR. The contents of word register WR are now transmitted into word input register WER and the contents of the addressed transmitter cell into the word output register WAR of storage operation control SOPS, and connected by the storage operation "OR". The result is subsequently recorded back into the transmitter cell in question. Thus the transmitter cell now contains meter bit combinations "10" or "11".

The program control now takes the unchanged storage word which is still stored in word output register WAR into word register WR. The test logic determines whether the polarity bit P, stored in bit 16 of the word register, has the value "1" or "0". If this bit has the value "0" (VII,n), the line assigned to the transmitter cell is on stop polarity. The program is then continued with the parallel testing of accumulator AK(II). If, however, conditions WR16 = 1 is satisfied, the test logic further tests whether condition WR17 = 0 is also satisfied, (VII). If the decision is negative (VIII,n), the program is again continued with the parallel testing of the accumulator (II). A positive decision (VII,j) leads to the testing of condition WR18 = 1 (IX). If this is not satisfied (IX,n), the second counter bit in word register WR is—as has already been described for the first counter bit—placed on "1" by test logic PL and —after the operation control VUE3 has received a storage cycle and has set register OPR —entered into the transmitter cell with a second storage operation "OR" so that it now contains the combination "1" (XI). There now follows after this storage operation, the parallel testing of accumulator AK.

If there now arrives a polarity change on the line assigned to the transmitter cell in question, and if the line connection unit LE places the B-bit and the counter bits in the transmitter cell on "0" before the operation control VUE3 has received a storage cycle for operation XI, the counter bit combination "01" will be stored in the transmitter cell after the execution of operation XI. This combination is then again placed on "0" at the transition to the start polarity to be supervised.

The test logic PL recognizes a desire for release by the fact that condition WR18 = 1 (IX) is satisfied. The contents of accumulator AK have been shifted to the left, step-by-step, whereby the processed bits were cancelled in each case and again entered into the accumulator on the right. Shift counter RB indicates the number of the steps. Operation control VUE3 now conveys to accumulator AK synchronizing pulses T, shifting the contents thereof to the right, and to shift counter RB synchronizing pulses T, lowering the contents thereof by "1" per step. After the shift counter RB is again placed back on "0", accumulator AK is also in its starting position again; the zero position of the shift meter is recognized by test logic PL. Thereupon, operation control VUE3 interrupts the conveying of the synchronizing pulses and again places the bit stored in one-bit-store E to location 18 of the word stored in the accumulator. Operating control VUE3 then opens, upon a signal of the test logic, the transmission paths between the shift meter RB, register RA as well as the basis and the multi-purpose register APR and transmits the address of the transmitter cell assigned to the connection to be released into this register. Now before the release is initiated, the data required for the interrogation of the remaining transmitter cells, the reconstructed accumulator contents and the address of the indication cell stored in register RA are safeguarded however, so that these are available after the request of the release program for the further uninterruped processing of the indication cell. Therefore, the contents of register RA and accumulator AK are transferred into one storage cell each. After the program request has been terminated, these data are again transferred into register RA and into accumulator AK. With the aid of the interrogation command to be read again, the group of transmitter cells is now further processed.

It is also possible in analogous manner within the framework of the invention to supervise the lines for permanent stop polarity. Through an additional indication in the interrogation command, which is decoded in command decoder D, and effects an appropriate setting of operation control VUE3, it can be achieved that the counter registration is increased at start polarity or at stop polarity or at both polarities. In each case after the reading of the transmitter cell (FIG. 8, VI: (ARP → WR) a decision is required by reasons of the mentioned indication as to which bit of the transmitter cell is to be put on "1", (for example 17 in the case of start polarity, 19 in the case of stop polarity). Analogous tests follow regarding decisions VII and VIII according to FIG. 8. The program is continued in each case with decision IX.

It is further possible within the framework of the invention to supervise simultaneously connections with two different release times (300 ms., or 600 ms., respectively). It is then indicated in the transmitter cells for which release time the assigned lines are to be supervised. The interrogation is two-phased. In the first interrogation cycle all transmitter cells are processed, in the second cycle, however, only the transmitter cells of the lines with 300 ms. release time.

It is however, also possible to let the program control carry out the further supervision after the interrogation of 300 ms. start polarity during the processing of the release program. The program control then places the counter bits in the transmitter cell in question on "0" and stores an information about the first time reaching of the highest meter stand. If the release program is requested a second time after 300 ms., the program control finally releases the connection. However, the program control can interrogate the transmitter cell in question after a delay time of 300 ms., and test the meter stand. If this counter registration is unchanged (11), the connection is released.

We claim:

1. A method of completing connections in stored program, programmed telecommunication switching installations for binary coded messages, wherein the lines are connected to a line connection unit for receiving and transmitting the polarity changes within the binary messages, and the connections between the transmitters and receivers are established or broken with the aid of a program control, and wherein the said line connection unit and the program control communicate with a storage unit containing the data and programs required to perform the switching tasks, and wherein to each transmitter a storage area for the reception of a storage word is permanently assigned, which contains during a connection an internal connection number identifying the receiver in each case and an information about the direction of the last polarity change, as well as about the registration of a counter reset to zero by each incoming polarity change, and which is read and tested by the program control within a specific time interval, whereby the counter registration at one of the two possible directions of the last polarity change is increased by "1", and upon the arriving at a predetermined counter registration, the release of the connection is initiated, comprising the steps of:

recording at a storage location , in each case permanently assigned to each transmitter , information identifying the transmitters to be supervised, testing in each case said storage location only when the there stored information demands supervision, the counter bit combination, contained in the said storage word, being checked and changed in the program control, recording counter bits , to be changed in each case during a single storage cycle through a logical OR operation at the store itself , into the storage area assigned to the transmitter in question.

2. The method defined in claim 1, comprising the further step of:

interrogating, one time, each transmitter cell, containing the counter registration, in the store by step-by-step interrogation so that the interrogation processes are evenly distributed over an interrogation cycle.

3. The method defined in claim 1, comprising the further step of:

interrogating, in each case at the beginning of an interrogation cycle, all transmitter cells in direct succession by successive interrogation.

4. The method defined in claim 1, comprising the further steps of:

dividing all transmitter cells into several equal groups and interrogating, successively, the transmitter cells within a group, the groups being interrogated in a step-by-step manner.

5. The method defined in claim 4, comprising the further steps of:

reading a transmitter cell to be interrogated in a first storage cycle, temporarily storing the contents thereof in the program control, and testing the counter registration and, upon the existence of the polarity to be supervised, increasing in a second storage cycle said counter registration with the storage operation OR.

6. The method defined in claim 5, comprising the further steps of:

placing the counter registration of a transmitter cell to be interrogated on "1" with the storage operation OR in a first storage cycle independent from the stored polarity, testing in the program control the storage word temporarily stored in the program control, said storage word having not been changed, and one of the steps of increasing, in a second storage cycle, with the storage operation OR the counter registration of the transmitter cell, or releasing the connection, or interrogating the next transmitter cell, the selection of said steps being dependent on the stored polarity and the counter registration of the unchanged storage word.

7. The method defined in claim 1, wherein connections with a supervision period of T or 2T are to be supervised, and comprising the further steps of:

interrogating and processing in a first interrogation cycle all transmitter cells and processing only those transmitter cells assigned to transmitters with supervision period T in the next following interrogation cycle.

8. The method defined in claim 1, wherein connections having supervision period of T or 2T are to be supervised, comprising the further steps of:

resetting to zero the counter registration in transmitter cells which are assigned to transmitters, participating in a connection, with the supervision period 2T, said counter registration having reached the highest registration corresponding to supervision period T, recording in an intermediate store information about the time of first reaching of the highest counter registration, interrogating, once more, said transmitter cells during the following supervision period T and releasing the connection after a renewed reaching of the highest counter registration.

9. The method defined in claim 1, wherein connections with supervision periods of T or 2T are to be supervised, comprising the additional steps of:

delaying connections with the supervision period 2T, after the reaching of the highest counter registration in transmitter cells which are assigned to transmitters participating in said connections, said connections being delayed by the supervision period T and, releasing said connections only if the counter registration remains unchanged.

10. The method defined in claim 1, comprising the additional step of:

storing the information identifying the transmitters to be supervised together with the address of the receiver in each case, the direction of the polarity change and the counter registration, in the transmitter cell in each case.

11. The method defined in claim 1, comprising the additional steps of:

storing the information identifying the transmitters to be supervised in an indication field within the store wherein a bit is permanently assigned to each transmitter cell to be interrogated, taking over in each case one storage cell of said indication field by the program control and interrogating only those transmitter cells wherein the registered bit is set on "1".

12. A circuit arrangement for supervising connections in storage-programmed telecommunications switching installations for binary coded messages, wherein the lines are connected into a line connection unit (LE) for receiving and transmitting polarity changes within the binary messages, and the connections between the transmitter and receivers are established or broken with the aid of a program control (PSt), wherein the said line connection unit and said program control unit communicate with a storage unit (SE) containing data and programs required to perform switching tasks, and wherein a storage area for the reception of a storage word is permanently assigned to each transmitter, said storage word containing, during a connection, an internal connection member identifying the receiver in each case, and information concerning the direction of the last polarity change, as well as concerning the registration of a counter reset to zero by each incoming polarity change, said storage word being read and tested by said program control within a specific time interval whereby the counter registration at one of the two possible directions of the last polarity change is increased by one, and upon the arrival at a predetermined counter registration, the release of the connection is initiated, comprising:

a storage operation control (SOPS) containing a word input register (WER) for the reception of a word to be placed into the store, and a word output register (WAR) for the reception of a word read out of a storage cell.

outlets of said registers being connected to a connection system (OE) connected to the storage inlet, with which the contents of the said registers are connectable in dependence on a control signal determining the manner of connection, storage operation register means (OPR), control system means (SST) for forming a control signal from the information stored in a storage operation register (OPR), said information being transmitted to said register (OPR) by either the programmed control or the line connection unit.

13. The circuit arrangement according to claim 12, additionally comprising:

word register means (WR) located in the interrogating program control, means for reading each storage word out of a transmitter cell during an interrogation and transmitting same from the word output register (WAR) into said word register (WR), operation control means (VUE), test logic (PL) for testing bits within a storage word, said logic being controlled into an operating condition by said operation control (VUE), said test logic including means for opening the transmission paths between the registers of the program control and between the store and the program control for the program effecting the interrogation of all transmitter cells each time the word register (WR) contains a storage word to be tested, said test logic (PL) further including means for changing the counter registration stored in the word register and to emit, after the counter has cycled, a control signal to the said operation control (VUE) causing the initiation of the release, and means for transmitting the storage word in said word register, when the counter has not cycled, into said word input register (WER), upon changed counter registration for the purpose of changing the counter registration of the word with equal address in the store .

14. The circuit arrangement according to claim 12, further comprising:

address counter register means (AZR) located within said program control and means connecting said address counter register, through an address register of the program control, to the address register of the storage operation control (SOPS), means for causing, at the beginning of each interrogation cycle , the beginning address of the storage area receiving the transmitter cells to be stored in said address counter register, said operation control (VUE1) increasing the count in address counter register AZR at every step of the interrogation cycle by the distance between the addresses of the transmitter cells to be interrogated and releasing the reading out of the store at the transmitter cell addressed.

15. The circuit arrangement according to claim 14, wherein:

said address counter register AZR is divided into a first register B for the reception of a fixed basis address, a second register for the counting of the groups of transmitter cells GZ and a third register, connected before said second register GZ for counting transmitter cells ZZZ within a group, switch-forward impulses of an operation control VUE1 are conveyed to the counter ZZZ which reaches the highest registration after the completion of a group, and places a one-bit store on "1", said test logic PL including means for recognizing this condition and transmitting a control signal to the operation control VUE1, which causes the communication of the address of the next command into the command counter BZ.

16. Circuit arrangement according to claim 13, wherein:

the beginning address of a group of transmitter cells is transmitted in each case into a first register RC of the program control PSt, and the number of transmitter cells in the group is put into a second register RB of the program control, said register RC containing the beginning address, is connected with the address register ARP of the program control, an operation control VUE2 increases at each step of the interrogation program in each case the contents of the first register RC by a number corresponding to the distance of the transmitter cells in the store, and decreases the contents of the second register RB by "1", said test logic PL including means for determining the registration of said second register and upon a "0" registration transmitting control signal to the operation control VUE2.

17. The circuit arrangement according to claim 13, further comprising:

first register means (RA) provided within the program control into which is transmitted at the beginning of each interrogation of a group of transmitter cells the address of the first storage cell of the indication field, means in an operation control (VUE3) for increasing the contents of said first register after resetting of the addressed indication cell by "1", and to effect the, at least partial, transmission of the storage word contained in this indication cell into a shift register within the program control, means for shifting contents of the shift register, counter means (RB) for counting each of the steps of the shift register, testing means (P) for recognizing a binary condition and for stopping counter (RB) upon recognition of a binary condition thereby identifying a supervision request of the indication bit appearing at the outlet of the shift register, and for preventing the continued counting of the counter (RB), the address of the transmitter cell, assigned to the indication bit, being formed with the aid of the first register (RA) and the counter (RB).

18. The circuit arrangement according to claim 17, wherein;

an accumulator AK of the program control is used as the shift register, and the shift counter RB of the accumulator as the counter.

19. Circuit arrangement according to claim 17, wherein:

the address of the transmitter cell is formed from the fixed contents of a basic register B, the last digits of the address of the indication cell in each case, stored in the said first register RA, and the contents of the said meter RB.

* * * * *